(12) United States Patent
Lehmann et al.

(10) Patent No.: US 11,718,747 B2
(45) Date of Patent: Aug. 8, 2023

(54) NANOPARTICLE CONTAINING COMPOSITIONS

(71) Applicants: Evonik Operations GmbH, Essen (DE); FRX Polymers, Inc., Chelmsford, MA (US)

(72) Inventors: Kathrin Lehmann, Leverkusen (DE); Sebastian Hessner, Essen (DE); Jan-Pleun Lens, Dover, MA (US); Xiudong Sun, Weston, MA (US)

(73) Assignees: Evonik Operations GmbH, Essen (DE); FRX Polymers, Inc., Chelmsford, MA (US)

( * ) Notice: Subject to any disclaimer, the term of this patent is extended or adjusted under 35 U.S.C. 154(b) by 387 days.

(21) Appl. No.: 15/733,375

(22) PCT Filed: Jan. 14, 2019

(86) PCT No.: PCT/EP2019/050807
§ 371 (c)(1),
(2) Date: Jul. 15, 2020

(87) PCT Pub. No.: WO2019/141624
PCT Pub. Date: Jul. 25, 2019

(65) Prior Publication Data
US 2020/0339802 A1     Oct. 29, 2020

Related U.S. Application Data

(60) Provisional application No. 62/617,825, filed on Jan. 16, 2018.

(30) Foreign Application Priority Data

Mar. 15, 2018  (EP) .................................... 18161903

(51) Int. Cl.
| | |
|---|---|
| C08L 67/02 | (2006.01) |
| C09D 7/65 | (2018.01) |
| C09D 7/61 | (2018.01) |
| C09D 7/40 | (2018.01) |
| C08G 79/04 | (2006.01) |
| C08J 3/22 | (2006.01) |
| C08J 5/18 | (2006.01) |
| C08K 3/34 | (2006.01) |
| C08L 69/00 | (2006.01) |
| C09D 5/18 | (2006.01) |
| C09D 167/02 | (2006.01) |
| C09D 169/00 | (2006.01) |
| C09J 11/04 | (2006.01) |
| C09J 11/08 | (2006.01) |
| C09J 167/02 | (2006.01) |
| C09J 169/00 | (2006.01) |
| C09K 21/02 | (2006.01) |
| C09K 21/14 | (2006.01) |

(52) U.S. Cl.
CPC .............. *C08L 67/02* (2013.01); *C08G 79/04* (2013.01); *C08J 3/226* (2013.01); *C08J 5/18* (2013.01); *C08K 3/346* (2013.01); *C08L 69/00* (2013.01); *C09D 5/18* (2013.01); *C09D 7/61* (2018.01); *C09D 7/65* (2018.01); *C09D 7/67* (2018.01); *C09D 167/02* (2013.01); *C09D 169/00* (2013.01); *C09J 11/04* (2013.01); *C09J 11/08* (2013.01); *C09J 167/02* (2013.01); *C09J 169/00* (2013.01); *C09K 21/02* (2013.01); *C09K 21/14* (2013.01); *C08J 2367/02* (2013.01); *C08J 2369/00* (2013.01); *C08J 2483/04* (2013.01); *C08J 2485/02* (2013.01); *C08K 2201/005* (2013.01); *C08K 2201/011* (2013.01); *C08L 2201/02* (2013.01); *C08L 2203/12* (2013.01); *C08L 2203/14* (2013.01); *C08L 2203/16* (2013.01); *C08L 2310/00* (2013.01)

(58) Field of Classification Search
CPC .... C08L 85/02; C08L 67/02; C08K 2201/011; C08K 3/346; C08G 18/6461; C08G 79/04
See application file for complete search history.

(56) References Cited

U.S. PATENT DOCUMENTS

| | | | |
|---|---|---|---|
| 4,613,641 A | * | 9/1986 | Haubennestel .......... C09D 7/47 524/265 |
| 7,317,044 B2 | | 1/2008 | Monsheimer et al. |
| 8,202,935 B2 | | 6/2012 | Alzer et al. |
| 8,450,229 B2 | | 5/2013 | Aneziris et al. |
| 9,783,656 B2 | | 10/2017 | Lehmann et al. |
| 9,840,581 B2 | | 12/2017 | Diehl et al. |

(Continued)

FOREIGN PATENT DOCUMENTS

| | | | | |
|---|---|---|---|---|
| CN | 103709615 A | * | 4/2014 | |
| CN | 105400179 A | * | 3/2016 | .............. C08L 75/06 |

(Continued)

OTHER PUBLICATIONS

Saad (Preparation and Properties of Poly(Vinyl Chloride)/Layered Silicate Nanocomposites, 16th International Conference on Composite Materials, 2007, 12 pages).*

(Continued)

*Primary Examiner* — Brieann R Johnston
(74) *Attorney, Agent, or Firm* — Grüneberg and Myers, PLLC

(57) ABSTRACT

Flame retardant compositions, blends and articles include phosphonate polymers, nanoparticles and optionally dispersing agents. A method for preparing such retardant composition, blends, and articles is also presented herein.

20 Claims, No Drawings

(56) References Cited

U.S. PATENT DOCUMENTS

| | | |
|---|---|---|
| 9,845,391 B2 | 12/2017 | Lehmann et al. |
| 2005/0027047 A1 | 2/2005 | Monsheimer et al. |
| 2006/0183815 A1 | 8/2006 | Alzer et al. |
| 2007/0021535 A1 | 1/2007 | Wursche et al. |
| 2007/0199477 A1 | 8/2007 | Hill et al. |
| 2010/0273636 A1 | 10/2010 | Aneziris et al. |
| 2011/0009539 A1 | 1/2011 | Goldacker et al. |
| 2012/0157607 A1* | 6/2012 | Lee .................. C08K 5/49 977/700 |
| 2012/0264844 A1* | 10/2012 | Freitag ............. C08L 85/02 524/610 |
| 2015/0189747 A1 | 7/2015 | Zeng et al. |
| 2016/0032045 A1 | 2/2016 | Diehl et al. |
| 2016/0362556 A1 | 12/2016 | Lehmann et al. |
| 2017/0002181 A1 | 1/2017 | Lehmann et al. |
| 2019/0112477 A1* | 4/2019 | Sun .................... C08L 67/02 |

FOREIGN PATENT DOCUMENTS

| | | |
|---|---|---|
| EP | 1 471 108 | 10/2004 |
| EP | 2 716 718 | 4/2014 |
| JP | 2007320980 A * | 12/2007 |
| KR | 10-2017-0004170 | 1/2017 |
| WO | 2014/105669 | 7/2001 |
| WO | 2007/027114 | 3/2007 |
| WO | 2009/012286 | 1/2009 |
| WO | 2012/088406 | 6/2012 |
| WO | 2012/165665 | 12/2012 |

OTHER PUBLICATIONS

Aqel (Carbon nanotubes, science and technology part (I) structure, synthesis and characterization, Arabian Journal of Chemistry, 2012, 5, pp. 1-23).*

Machine translation of JP 2007320980 (2007, 22 pages).*

Machine translation of CN 103709615 (2014, 2 pages).*

Machine translation of CN 105400179 (2016, 5 pages).*

International Search Report dated Feb. 14, 2019 in PCT/EP2019/050807.

Written Opinion dated Feb. 14, 2019 in PCT/EP2019/050807.

U.S. Appl. No. 11/448,914, filed Jun. 8, 2006, Patent Publication No. 2007/0021535, Wursche et al.

U.S. Appl. No. 11/509,741, filed Aug. 25, 2006, Patent Publication No. 2007/0199477, Hill et al.

U.S. Appl. No. 12/865,242, filed Jul. 29, 2010, Patent Publication No. 2011/0009539, Goldacker et al.

* cited by examiner

NANOPARTICLE CONTAINING COMPOSITIONS

CROSS-REFERENCE TO RELATED APPLICATIONS

This application is a National Stage entry under § 371 of International Application No. PCT/EP2019/050807, filed on Jan. 14, 2019, and which claims the benefit of European Application No. 18161903.2, filed on Mar. 15, 2018, and U.S. Provisional Application No. 62/617,825, filed on Jan. 16, 2018, the content of all of which are hereby incorporated by reference in their entireties.

BACKGROUND OF THE INVENTION

A number of approaches have been investigated to impart fire resistance to polymers with varying degrees of success. In general, it has been extremely challenging to impart fire resistance into polymers without detracting from other important properties such as processability, ability to melt spin fibers, and mechanical properties.

Phosphonate containing oligomers and polymers have shown flame retardant activity in a number of engineering plastics. However, these phosphonates materials require high loadings in the thermoplastic resin, even with the addition of different synergists such as melamine based materials (US 2009/0043013 A1).

Thus, there is a need for polymer compositions having improved fire resistance while preferably maintaining desired polymer characteristics.

SUMMARY OF THE INVENTION

A. Described herein is a flame retardant composition comprising:
  i. at least one phosphonate oligomer or polymer;
  ii. nanoparticles; and
  iii. optionally a dispersing agent.
B. Some embodiments provide a blend comprising
  i. the flame retardant composition of the invention; and
  ii. a second polymer.
C. Other embodiments provide a method for making the above flame retardant compositions or a blend comprising the above flame retardant compositions, and further an article consisting of the named blend.

DETAILED DESCRIPTION OF THE INVENTION

This disclosure is not limited to the particular systems, devices and methods described, as these may vary. The terminology used in the description is for the purpose of describing the particular versions or embodiments only and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

"Optional" or "optionally" means that the subsequently described event or circumstance may or may not occur, and that the description includes instances where the event occurs and instances where it does not.

The term "carbonate" as used herein is given its customary meaning, e.g., a salt of carbonic acid ($H_2CO_3$) containing the divalent radical $CO_3$ or an uncharged ester of this acid. A "diaryl carbonate" ($(ArylO)_2CO$) is a carbonate with at least two aryl groups associated with the $CO_3$ radical, the most predominant example of a diaryl carbonate is diphenyl carbonate ($(PhO)_2CO$); however, the definition of diaryl carbonate is not limited to this specific example.

The term "phosphonate oligomers and polymers" as used herein means oligomers and polymers containing ester groups of phosphonic acid $RP(O)(OH)_2$, i.e. ester groups of the general formula [RP(O)(OR')(OR")], with R, R' R" independently selected from organic radicals.

The term "aromatic diol" is meant to encompass any aromatic or predominately aromatic compound with at least two associated hydroxyl substitutions. Preferably the aromatic diol comprises at least two phenolic hydroxy groups. More preferably the aromatic diols include 4,4'-dihydroxybiphenyl, hydroquinone, resorcinol, methyl hydroquinone, chlorohydroquinone, acetoxyhydroquinone, nitrohydroquinone, 1,4-dihydroxynaphthalene, 1,5-dihydroxynaphthalene, 1,6-dihydroxynaphthalene, 2,6-dihydroxynaphthalene, 2,7-dihydroxynaphthalene, 2,2-bis(4-hydroxyphenyl)propane, 2,2-bis(4-hydroxy-3,5-dimethylphenyl)propane, 2,2-bis(4-hydroxy-3,5-dichlorophenyl)propane, 2,2-bis(4-hydroxy-3-methylphenyl)propane, 2,2-bis(4-hydroxy-3-chlorophenyl)propane, bis(4-hydroxyphenyl)methane, bis(4-hydroxy-3,5-dimethylphenyl)methane, bis(4-hydroxy-3,5-di chlorophenyl)methane, bis(4-hydroxy-3,5-dibromophenyl)methane, bis(4-hydroxy-3-methylphenyl)methane, bis(4-hydroxy-3-chlorophenyl)methane, 1,1-bis(4-hydroxyphenyl)cyclohexane, bis(4-hydroxyphenyl)ketone, bis(4-hydroxy-3,5-dimethylphenyl)ketone, bis(4-hydroxy-3,5-dichlorophenyl)ketone, bis(4-hydroxyphenyl) sulfide bis(4-hydroxyphenyl) sulfone, phenolphthalein or phenolphthalein derivatives, 4,4'-thiodiphenol, 4,4'-sulfonyldiphenol, 4,4'-dihydroxydiphenylether, and 1,1-bis-(4-hydroxyphenyl)-3,3,5-trimethylcyclohexane or any combination thereof. Especially preferably the aromatic diols are selected from resorcinols, hydroquinones, catechols, and bisphenols, preferred bisphenols are bisphenol A, bisphenol F, and 4,4'-biphenol, phenolphthalein, 4,4'-thiodiphenol, 4,4'-sulfonyldiphenol, 1,1-bis-(4-hydroxyphenyl)-3,3,5-trimethylcyclohexane, or any combination thereof.

The term "alkyl" or "alkyl group" refers to a branched or unbranched hydrocarbon or group of 1 to 20 carbon atoms, preferably methyl, ethyl, n-propyl, isopropyl, n-butyl, isobutyl, t-butyl, octyl, decyl, tetradecyl, hexadecyl, eicosyl, tetracosyl. "Cycloalkyl" or "cycloalkyl groups" are branched or unbranched hydrocarbons in which all or some of the carbons are arranged in a ring, preferably cyclopentyl, cyclohexyl, methylcyclohexyl and the like. The term "lower alkyl" includes an alkyl group of 1 to 10 carbon atoms.

The term "aryl" or "aryl group" refers to monovalent aromatic hydrocarbon radicals or groups consisting of one or more fused rings in which at least one ring is aromatic in nature. Aryls include preferably phenyl, naphthyl, biphenyl ring systems and the like. The aryl group preferably are unsubstituted or substituted with a variety of substituents preferably including alkyl, alkenyl, halide, benzylic, alkyl or aromatic ether, nitro, cyano, and the like and combinations thereof.

"Substituent" refers to a molecular group that replaces a hydrogen in a compound and include preferably trifluoromethyl, nitro, cyano, $C_1$-$C_{20}$ alkyl, aromatic or aryl, halide (particularly F, Cl, Br, I), $C_1$-$C_{20}$ alkyl ether, $C_1$-$C_{20}$ alkyl ester, benzyl halide, benzyl ether, aromatic or aryl ether, hydroxy, alkoxy, amino, alkylamino (—NHR'), dialkylamino (—NR'R") or other groups which do not interfere with the formation of the intended product.

As defined herein, an "arylol" or an "arylol group" is an aryl group with a hydroxyl, OH substituent on the aryl ring. Preferably an arylol are phenol, naphthol, and the like. A wide variety of arlyols may be used in various embodiments of the compositions described herein and are commercially available.

The term "alkanol" or "alkanol group" refers to a compound including an alkyl of 1 to 20 carbon atoms or more having at least one hydroxyl group substituent. Preferred alkanols are selected from methanol, ethanol, 1- and 2-propanol, 1,1-dimethylethanol, hexanol, octanol and the like. Alkanol groups may be optionally substituted with substituents as described above.

The term "alkenol" or "alkenol group" refers to a compound including an alkene with 2 to 20 carbon atoms or more having at least one hydroxyl group substituent. The hydroxyl may be arranged in either isomeric configuration (cis or trans). Alkenols may be further substituted with one or more substituents as described above and may be used in place of alkenols in some embodiments. Alkenols are known to those skilled in the art and many are readily available commercially.

The terms "flame retardant", "flame resistant", "fire retardant", "fire resistant" or "fire resistance" as used herein, preferably mean that the composition generally exhibits a limiting oxygen index (LOI) of at least 27. "Flame retardant", "flame resistant", "fire retardant", "fire resistant" or "fire resistance" preferably also refer to the flame reference standard ASTM D6413-99 for textile compositions, fire classification NF P 92-503, and similar standards for flame resistant fibers and textiles. Fire resistance is more preferably tested by measurements in accordance with the UL 94 test method. In this test, the tested materials are given classifications of UL-94 V-0, UL-94 V-1, and UL-94 V-2 on the basis of the results obtained with ten test specimens. Briefly, the criteria for each of these UL-94-V-classifications are as follows:

V-0:
criterion 1: The specimens may not burn with flaming combustion for more than 10 seconds after either application of the test flame.
criterion 2: The total flaming combustion time may not exceed 50 seconds for the 10 flame applications for each set of 5 specimens.
criterion 3: The specimens may not burn with flaming or glowing combustion up to the holding clamp.
criterion 4: The specimens may not drip flaming particles that ignite the dry absorbent surgical cotton located 300 mm below the test specimen.
criterion 5: The specimens may not have glowing combustion that persists for more than 30 seconds after the second removal of the test flame.

V-1: weaker requirements than V-0; criterion 1: 30 secs; criterion 2: 250 secs; criteria 3 & 4: as in V-0; criterion 5: 60 secs.

V-2: weaker requirements than V-1; criteria 1, 2 & 3: as in V-1; criterion 4: The specimens can drip flaming particles that ignite the dry absorbent surgical cotton; criterion 5: as in V-1.

Not classifiable (ncl): does not meet class V-0, V-1, or V-2.

These test methods provide a laboratory test procedure for measuring and comparing the surface flammability of materials when exposed to a prescribed level of radiant heat energy to measure the surface flammability of materials when exposed to fire. The test is conducted using small specimens that are representative, to the extent possible, of the material or assembly being evaluated. The rate at which flames travel along surfaces depends upon the physical and thermal properties of the material, product or assembly under test, the specimen mounting method and orientation, the type and level of fire or heat exposure, the availability of air, and properties of the surrounding enclosure. If different test conditions are substituted or the end-use conditions are changed, it may not always be possible by or from this test to predict changes in the fire-test-response characteristics measured. Therefore, the results are valid only for the fire test exposure conditions described in this procedure. The state-of-the-art approach to rendering polymers flame retardant is to use additives such as brominated compounds or compounds containing aluminum and/or phosphorus. Some of these compounds are toxic, and can leach into the environment over time, making their use less desirable. In some countries, certain brominated additives are being phased out of use because of environmental concerns.

The term "toughness," as used herein, is meant to imply that the material is resistant to breaking or fracturing when stressed or impacted. There are a variety of standardized tests available to determine the toughness of a material. Generally, toughness is determined qualitatively using a film or a molded specimen.

"Number average molecular weight" (Mn) and "weight average molecular weight" (Mw) are both determined by gel permeation chromatography (GPC). Unless otherwise indicated, the values recited are based on polystyrene standards.

GPC is a type of chromatography that separates polymers by size. This technique provides information about the molecular weight and molecular weight distribution of the polymer, i.e., the polydispersity index (PDI). Preferably GPC is preferred method to determine the molecular weight and the molecular weight distribution. Preferably GPC is performed using an appropriate polystyrene standard. Various embodiments are directed to compositions containing a phosphorous containing polymer or oligomer and nanoparticles, and polymer mixtures containing an engineering polymer, a phosphorous containing polymer or oligomer, and nanoparticles. Such compositions and polymer mixtures may exhibit good mechanical properties and excellent flame retardancy. Further embodiments are directed to articles of manufacture including these compositions and polymer mixtures and method for making such compositions and polymer mixtures.

The phosphonate oligomers or polymers may be linear or branched. The phosphonate oligomers or polymers may preferably comprise non-phosphorous moieties. Such phosphonate oligomers and polymers have a statistical construction. "Statistical distributions" are of block construction with any desired number of blocks and with any desired sequence or are subject to a randomized distribution; they may also have an alternating construction or else form a gradient over the chain; more particularly they can also form any mixed forms in which groups with different distributions may optionally follow one another. The nature of specific embodiments can result in restrictions to the random distributions. In all regions unaffected by the restriction there is no change to the random distribution.

The indices reproduced in the formulae given here, and the ranges of values for the indices stated, should be understood as the average values of the possible statistical distribution of the structures and/or mixtures thereof that are actually present. This also applies to structural formulae exactly reproduced per se as such.

In certain embodiments, the phosphonate component may have the structures described and claimed in U.S. Pat. Nos. 6,861,499, 7,816,486, 7,645,850, 7,838,604, 8,415,438, 8,389,664, 8,648,163, 8,563,638, 8,779,041, 8,530,044, and 9,745,424, each of which is hereby incorporated by reference in its entirety.

Phosphonate oligomers or polymers include more preferably repeating units derived from aryl alkylphosphonate monomers or aryl arylphosphonate monomers. Still more preferably the phosphonate polymers include structural units illustrated by formula (I):

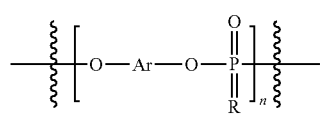

(I)

where Ar is an aromatic group and —O—Ar—O— preferably derived from an "aromatic diol" as defined above; R is the same or different selected from $C_{1-20}$ alkyl, $C_{2-20}$ alkene, $C_{2-20}$ alkyne, $C_{5-20}$ cycloalkyl, or $C_{6-20}$ aryl, preferably R is a $C_{1-20}$ alkyl, more preferably R is a methyl; and the index n is an integer from 3 to 200, 5 to 150, or 20 to 100, or any integer between these ranges.

Preferably the phosphonate oligomers or polymers have a weight average molecular weight (Mw) of 1,000 g/mole to 200,000 g/mole as determined by GPC, more preferably from 10,000 to 150,000 g/mole, especially preferably from 20,000 to 100,000 g/mole.

Preferably the phosphonate oligomers or polymers have a number average molecular weight (Mn) preferably from 500 g/mole to 150,000 g/mole, more preferably from 2,000 g/mole to 100,000 g/mole, especially preferably from 5,000 to 50,000 g/mole.

Preferably the phosphonate oligomers or polymers have a polydispersity (i.e., Mw/Mn) of from 2 to about 7 still more preferably from 2 to 5.

The phosphonate oligomers polymers may comprise additionally to the units of formula (I) other non-phosphorous containing units, preferably units of an analog of formula (I) wherein the phosphorous atom is replaced by a carbon atom or hydrocarbon group. These copolyphosphonates preferably further comprise units of the formulae (II) and/or (III):

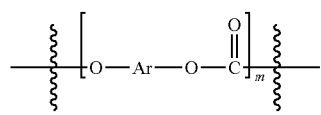

(II)

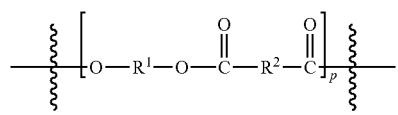

(III)

and combinations thereof, where Ar is as described in formula (I); $R^1$ and $R^2$ are the same or different aliphatic or aromatic hydrocarbons, preferably selected from $C_{1-20}$ alkylene, $C_{2-20}$ alkenylene, $C_{2-20}$ alkynylene, $C_{5-20}$ cycloalkylene, or $C_{6-20}$ arylene; and each m and p is independently an integer from 1 to 50, 2 to 30 or 3 to 20, or any integer between these ranges. In cases where units of the formulae (II) and/or (III) are present the number of units of formula (I) will be reduced; thus index n is in these cases an integer from 2 to 150, 3 to 100, or 5 to 75, or any integer between these ranges.

The phosphonate and carbonate content of the copolyphosphonates, may vary among embodiments, and embodiments are not limited by the phosphonate and/or carbonate content or range of phosphonate and/or carbonate content. For example, in some embodiments, the co-(phosphonate carbonate)s or co-(phosphonate ester)s may have a phosphorus content, of from about 1% to about 20% by weight of the total polymer, and in other embodiments, the phosphorous content may be from about 2% to about 10% by weight of the total polymer.

Preferably bisphenol A may make up 5% to 100%, 10% to 90%, 20% to 80%, 30% to 70%, 40% to 60%, or a value between any of these ranges of the aromatic diol, with the remainder being another bisphenol such as any one or more of the bisphenols described above. Particularly preferably bisphenol A is the only (i.e., 100%) bisphenol used in the preparation of the phosphonate component.

Preferably the copolyphosphonates have a weight average molecular weight (Mw) of 1,000 g/mole to 50,000 g/mole as determined by GPC, more preferably from 10,000 to 40,000 g/mole, especially preferably from 20,000 to 30,000 g/mole. Preferably the copolyphosphonates have a number average molecular weight (Mn) preferably from 500 g/mole to 45,000 g/mole, more preferably from 1,000 g/mole to 35,000 g/mole, especially preferably from 2,000 to 25,000 g/mole. The molecular weight distribution (i.e., Mw/Mn) of such copolyphosphonates is preferably from 2 to 7 and more preferably from 2 to 5.

Particularly preferred embodiments of the phosphonate oligomers or polymers and the copolyphosphonate polymers embodiments are those wherein the Ar in formulae (I), (II) and (III) is derived from bisphenols or hydroquinones, more preferably derived from bisphenol A; and R in formulae (I), (II) and (III) is a methyl group. Such compounds have preferably structures of formulae (IV), (V), and (VI):

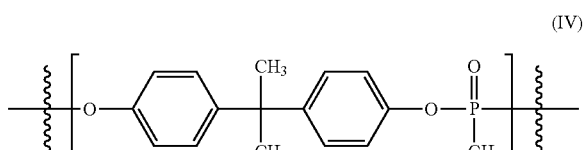

(IV)

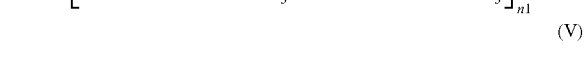

(V)

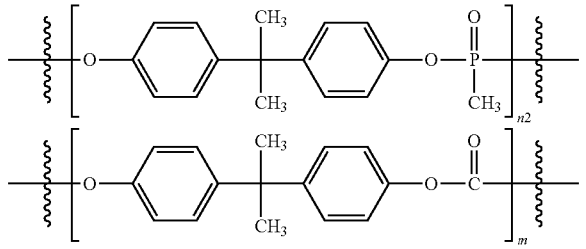

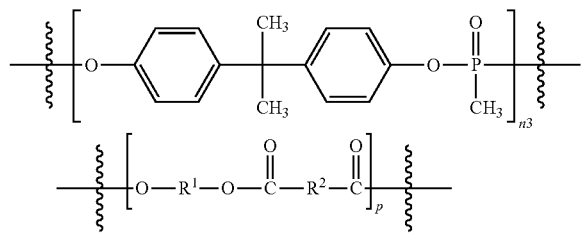

(VI)

where each of n1, n2, n3 independently is from 2 to 200, 5 to 150, or 20 to 100, and m, p, and $R^1$ and $R^2$ is defined as in formulae I, II, III.

The phosphorous content of phosphonate oligomers or polymers and copolyphosphonates is preferably controlled by the molecular weight of the "aromatic diol" used. A lower molecular weight aromatic diol may produce phosphonate oligomers or polymers and copolyphosphonates with a higher phosphorus content. Aromatic diol, such as resorcinol, hydroquinone, catechol, or a combination thereof or similar low molecular weight aromatic diols may be used to make phosphonate oligomers or polymers and copolyphosphonates with high phosphorous content.

The phosphorus content, expressed in terms of the weight percentage, of the phosphonate oligomers or polymers and copolyphosphonates is preferably in the range of 2% to 18%, 4% to 16%, 6% to 14%, 8% to 12%. Preferably the phosphonate polymers and copolyphosphonate prepared from bisphenol A or hydroquinone have phosphorus contents of 10.8% and 18%, respectively.

The copolyphosphonates have a smaller amount of phosphorus content compared to the phosphonate oligomers and the polyphosphonates (i.e. phosphonate polymers). In further preferred embodiments, a bisphenol A-based copolyphosphonate containing phosphonate and carbonate components wherein the phosphonate component is derived from the methyl diphenylphosphonate at a concentration of 20 mole % compared to the total of the phosphonate and carbonate starting components may have 2.30% phosphorus, 2.35% phosphorus, 2.38% phosphorus, 2.40% phosphorus, or a range between any of these values, including endpoints.

Each phosphonate component described above can be made by any method. In certain embodiments, the phosphonate component may be made using a polycondensation or transesterification method, and in some embodiments, the transesterification catalyst used in such methods may be a non-neutral transesterification catalyst, such as, for example, tetraphenylphosphonium phenolate, metal phenolate, sodium phenolate, sodium or other metal salts of bisphenol A, ammonium phenolate, non-halogen containing transesterification catalysts, and the like, or a combination thereof.

As used herein, the term "nanoparticles" means organic or inorganic particles, preferably inorganic particles, more preferably the particles are oxides and/or hydroxides, still more preferably particles of mineral origin or synthetic origin; it is particularly preferable that the particles comprise oxides and/or hydroxides of aluminum, of titanium, of zinc, of tin, of vanadium, of cerium, of iron, of magnesium or of silicon, and it is more particularly preferable that the particles comprise aluminum- and/or silicon oxides/hydroxides, especially preferably attapulgite, bentonite, montmorillonite, boehmite, illite, hydroxyapatite, smectite, kaolinite, dickit, natkrit, sepiolit, hectorite, halloysite and talcum particles, or any combination thereof. Further preferably the nanoparticles are nanoclays. Nanoclays are nanoparticles of layered mineral silicates, these can be unmodified or organically-modified nanoclays (organoclays); the latter are hybrid organic-inorganic nanomaterials. Furthermore, preferably the nanoparticles are montmorillonite, further particular preferably organically-modified montmorillonite.

Usually, nanoclays exhibit best property enhancement when they are homogenously dispersed in the composition in which they are used. The most common dispersion techniques include intercalation, flocculation, and exfoliation by which the original micron sized materials can break down into nanoscale particles. The nanoparticles described herein have a length in at least one dimension, i.e. in one, two or three dimensions, preferably in only one dimension of 1 nm to 1000 nm, preferably 1 nm to 100 nm, more preferably 1 nm to 50 nm, even more preferably 1 nm to 20 nm. Preferably, the nanoparticles are nano-objects as defined in ISO/DIS 21363:2018-09 (referring to ISO/TS 80004-2: 2015 and ISO/TS 80004-1:2015), wherein a nano-object is defined as a discrete piece of material with one, two or three dimensions in the nanoscale, and nanoscale is defined as a length range of from 1 nm to 100 nm. Preferably, the dimension of the particles is determined with TEM micrographs, e.g. as described in Pyrz. et al., Langmuir 2008, 24, 11350-11360 or in ISO/DIS 21363:2018-09. Most preferably the dimension of the particle is determined with TEM according to ISO/DIS 21363:2018-09. Preferably, the nanoparticles are nanoclays, more preferably with a layer thickness of 1 nm to 50 nm, preferably of 1 nm to 20 nm. The layers are stacked to a package. These packages are preferably of a thickness of 100 nm to 10 μm. The organoclays are preferably stacked layers of an individual thickness of 1 nm to 5 nm and a package thickness only a few layers (up to 10 layers, preferably up to 5 layers) down to single plates.

Preferably the nanoparticles of the inventive flame retardant compositions make up from 1% to 75%, by weight, more preferably 5 wt. % to 50 wt. %, yet more preferably 8 wt. % to 45 wt. %, yet more preferably 10 wt. % to 40 wt. %, particularly preferably 15 wt. % to 30 wt. % based on the mass of the flame retardant composition.

The flowability can be determined by determination of the MFI (melt flow index) according to DIN EN ISO 1133 e.g. with a Meltfixer from SWO Polymertechnik.

The compositions of embodiments described above may be prepared by mixing the nanoparticles with the phosphorous containing polymer or oligomers. In some embodiments, such methods may further include the step of heating the phosphorous containing polymer or oligomers and/or melting the polymer or oligomers. Such compositions may be incorporated into polymer mixtures by mixing the composition containing nanoparticles and the phosphorous containing polymer or oligomers with one or more other polymers.

The phosphonate oligomers or polymers and copolyphosphonates of preferred embodiments may be synthesized from at least 20 mole % diaryl alkylphosphonate or optionally substituted diaryl alkylphosphonate, one or more diaryl carbonate, and one or more aromatic diol, wherein the mole percent of the high purity diaryl alkylphosphonate is based on the total amount of transesterification components, i.e., total diaryl alkylphosphonate and total diaryl carbonate. Likewise, co-(phosphonate ester)s of certain embodiments may be synthesized from at least 20 mole % diaryl alkylphosphonate or optionally substituted diaryl alkylphosphonate, one or more diaryl ester, and one or more aromatic diol, wherein the mole percent of the high purity diaryl alkylphosphonate is based on the total amount of transesterification components.

Further comprising additives are selected from the group consisting of dispersing agents known in the art, preferably waxes, organic acid derivatives or oligomeric/polymeric derivatives, preferably oligomeric/polymeric derivatives. Preferred waxes are natural waxes, montanic acid ester, synthetical waxes and polyolefin waxes. Preferred organic acid derivatives are fatty acids/esters/amides, saponified fatty acids and glycerol esters; preferably stearic acid, zinc stearate and sorbitan acid esters. Preferred oligomeric/polymeric derivatives are polyacrylates, polyethers, polyesters and polysiloxanes, mixtures of these and copolymers out of sub structures of these; for the sake of clarity the term "poly" includes oligomeric structures. More preferred dispersing agents are selected from the group consisting of polyether modified siloxanes (polyether modified polysiloxanes), polyester modified siloxanes (polyether modified polysiloxanes), and polyester-polyamines, in particular preferred dispersing agents are polyether modified and/or polyester modified siloxanes.

Dispersing agents are known to the person skilled in the art. Dispersing agents are surface-active substances ("surfactants"), which are used to improve the separation of discrete particles and prevent settling or clumping of these particles which are dispersed in a continuous phase.

Preferred polysiloxanes are polyether modified siloxanes and polyester modified siloxanes.

Preferred polyether modified siloxanes are those disclosed as defoaming agents (defoamers) in EP 1382632 B1 (U.S. Pat. No. 6,858,663), and are those disclosed as dispersing agents (dispersants) in WO 2015/091041 (US 2017/0002181 A1), which are hereby incorporated by reference in their entirety. In case of polysiloxanes with chain lengths of 15 or more siloxane moieties, the claimed dispersants of US 2017/0002181 A1 are particularly preferred; in case of shorter polysiloxanes the claimed defoamers of EP 1382632 B1 are particularly preferred, e.g. in formula (I) of claim 1 (EP 1382632 B1);

The dispersants of US 2017/0002181 are polyether modified siloxanes of the general formula (A):

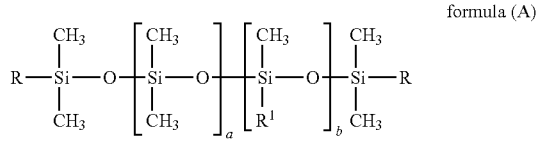

formula (A)

where
R identically or differently is $R^1$, methyl, or hydroxy,
$R^1$ identically or differently is a polyether moiety of the formula (A')

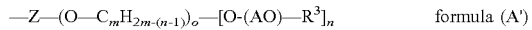   formula (A')

where
Z is a branched or unbranched alkylene moiety having from 2 to 4 carbon atoms,
m is from 2 to 4,
n is from 1 to 3,
o is 0 or 1,
AO identically or differently is an oxyalkylene moiety comprising one or more oxyethylene, oxypropylene, and/or oxybutylene moieties, $R^3$ identically or differently is hydrogen or an alkyl moiety having from 1 to 4 carbon atoms,
with the proviso that in $R^1$ the total number of carbon atoms and oxygen atoms is at least 70,
a is from 20 to 200,
b is from 1 to 50,
with the proviso that if none of the moieties R is $R^1$, b is at least 3.

The oxyalkylene moiety AO preferably comprises more than one moiety selected from the group consisting of oxyethylene, oxypropylene, and/or oxybutylene moieties, i.e. it is preferred that the oxyalkylene moiety AO preferably is a polyoxyalkylene moiety with more than one oxyalkylene unit. More preferably the oxyalkylene moiety AO identically or differently is a polyoxyalkylene moiety comprising, preferably consisting of oxyalkylene moieties selected from oxyethylene, oxypropylene, and/or oxybutylene.

Preferably $R^1$ in formula (A) identically or differently is

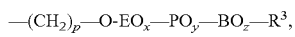

with the proviso that in $R^1$ the total number of carbon atoms and oxygen atoms is at least 70,
EO is oxyethylene,
PO is oxypropylene,
BO is oxybutylene,
x is from 0 to 20, preferably from 3 to 15, with particular preference from 4 to 10,
y is from 5 to 100, preferably from 8 to 50, with particular preference from 10 to 30,
z is from 0 to 20,
p is from 2 to 4, preferably 2 and/or 3.

It is preferred that the numeric ratio of index a to index b in formula (A) is from 8 to 18, preferably from 9 to 15, and in particular from 10 to 12.

Preferably, for polyether modified siloxanes of formula (A) index x is between 0.05 and 1.2 times the sum of the indices (y+z), preferably between 0.07 and 0.8 times, in particular between 0.1 and 0.5 times.

It is preferred, that for polyether modified siloxanes of formula (A):
R is methyl,
a is from 80 to 95,
b is from 5 to 8,
$R^3$ is hydrogen,
x is from 3 to 5,
y is from 10 to 25,
z is 0.

The defoamers of EP 1382632 B1, used as dispersing agents, are polyether modified siloxanes of the general formula (B)

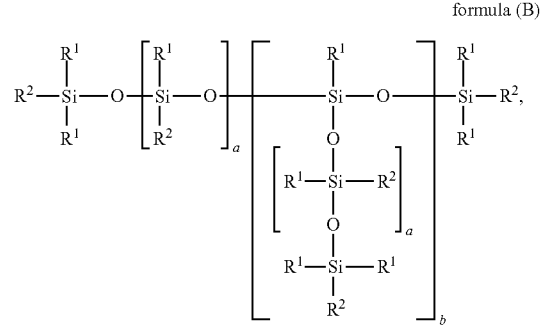

formula (B)

where the radicals

R$^1$ are alkyl radicals having 1 to 4 carbon atoms or aryl radicals, but at least 80% of the radicals R$^1$ are methyl radicals, R$^2$ in the molecule are identical or different and can have the following definitions:

(a)

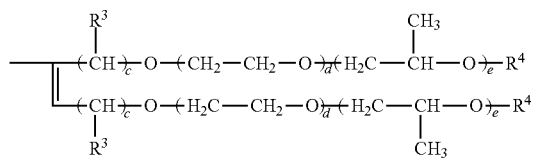

in which
R$^3$ is a hydrogen or alkyl radical,
R$^4$ is a hydrogen, alkyl or carboxyl radical,
c is a number from 1 to 20,
d is a number from 0 to 50,
e is a number from 0 to 50,
or
(b)

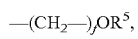

in which
R$^5$ is a hydrogen, alkyl or carboxyl radical or a dimethylol propane radical containing ether groups if desired, and
f is a number from 2 to 20,
or
(c)

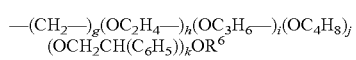

in which
R$^6$ is a hydrogen, alkyl or carboxyl radical,
g is a number from 2 to 6,
h is a number from 0 to 20,
i is a number from 1 to 50,
j is a number from 0 to 10,
k is a number from 0 to 10,
or
(d) corresponds to the radical R$^1$,
with the proviso that in the average molecule at least one radical R$^2$ has the definition (a),
a is a number from 1 to 500, and
b is a number from 0 to 10.

For organopolysiloxanes of the general formula (B) it is preferred that b=0. It is also preferred that in formula (B) the radicals R$^1$ are methyl radicals, a=1 to 50 and b=0.

It is preferred that the radical R$^3$ in formula (B) is hydrogen.

It is preferred that R$^4$ in formula (B) is hydrogen or an acyl radical.

For organopolysiloxanes of the general formula (B) it is preferred that the index c is 1 or 2 and d and e independently of one another are form 0 to 10.

For organopolysiloxanes of the general formula (B) it is preferred that R$^6$ is hydrogen or a methyl radical, g=3, h=0 to 12, i=8 to 30 and j and k independently of one another are <5, in particular 0.

Preferred polyester modified siloxanes are those disclosed as component b) of claim 1 in EP 2 616 512 B1 which is hereby incorporated by reference.

Preferred polyester modified siloxanes are those as disclosed in EP 2 616 512 B1, which are polyester modified siloxanes of the general formula (C)

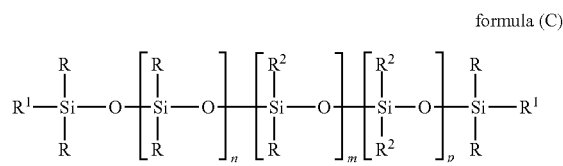

formula (C)

where
R, independently of one another, are an alkyl moiety having from 1 to 11, preferably from 1 to 4, carbon atoms,
R$^1$, independently of one another, are R or a polyester moiety,
R$^2$, independently of one another, are R or a polyester moiety,
n, m and p, independently of one another, are from 0 to 58, with the proviso
that N=n+m+p+2 is from 15 to 75,
and
no R$^1$ is R when all R$^2$ are R, and at least one R$^2$ is not R when all R$^1$ are R
and/or
no moiety R$^1$ is R when m and p are 0, and m or p, preferably m, is not 0 when all moieties R$^1$ are R.

Preferred polyester moieties are composed of from 3 to 30, preferably of from 8 to 25, and particularly preferably of from 15 to 25, ester units, and/or have, as starter alcohols, alcohol moieties which derive from primary unsaturated alcohols, preferably such that the polyester moieties have a structure according the formula:

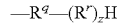

where
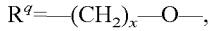
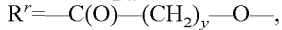
x=from 2 to 10, preferably from 3 to 7, in particular 6, and
y=from 2 to 10, preferably from 3 to 8, and with preference 4 or 5,
z=from 3 to 30, preferably from 8 to 25, and particularly preferably from 15 to 25,
where the polyester moieties are composed of identical or different starting molecules, and the polyester moieties are preferably composed of identical starting molecules.

Polyacrylates and their esters, and polyesters and polyester-polyamines may also be used as dispersants. Preferred polyacrylates and their esters, and preferred polyesters and polyester-polyamines are disclosed in WO 1994/021368 (U.S. Pat. No. 5,700,395), WO 1998/019784 (U.S. Pat. No. 6,197,877), EP 713894 (U.S. Pat. No. 6,194,539), WO2001/021298 (U.S. Pat. No. 6,787,600), WO 2012/059489 (U.S. Pat. No. 9,620,257), and EP 1685895 B1 which are hereby incorporated by reference, more preferred are the polyacrylate esters and polyester-polyamines which are claimed in U.S. Pat. No. 9,620,257 and EP 1685895 B1, particularly preferred are the polyacrylate esters and polyester-polyamines claimed in U.S. Pat. No. 9,620,257 B1 in claim 1 as component (c), in particular components (c1) and (c2), which are hereby incorporated by reference.

Component (c) as disclosed in U.S. Pat. No. 9,620,257 B1 is selected from among the group consisting of:
(c1) polyacrylic esters, which can be prepared by esterification of:

an alkyl polyacrylate which is obtained by polymerization and whose alkyl radicals have from 1 to 3 carbon atoms; with
a component selected from the group consisting of:
(c1-1) saturated aliphatic alcohols having from 4 to 50 carbon atoms; and
(c1-2) unsaturated aliphatic alcohols having from 4 to 50 carbon atoms;
where components (c1-1) and (c1-2) are used in such amounts that from 30 to 100% of the ester groups are transesterified; and
(c2) polyester-polyamine condensation products, which are obtained by partial or complete reaction of:
(c2-1) one or more amino-functional polymers containing at least four amino groups; with
(c2-2) one or more polyesters of the general formula (c-I) or (-Ia):

T-C(O)—[O-A-C(O)]$_x$—OH    (c-I);

T-O—[C(O)-A-O—]$_y$—Z    (c-Ia); and (c2-3) one or more polyethers of the general formula (c-II) or (c-IIa):

T-C(O)—B—Z    (c-II);

T-O—B—Z    (c-IIa);

where:
T is a hydrogen radical and/or an optionally substituted, linear or branched aryl, arylalkyl, alkyl, or alkenyl radical having from 1 to 24 carbon atoms;
A is at least one divalent radical selected from the group consisting of linear, branched, cyclic, and aromatic hydrocarbons;
Z is at least one radical selected from the group consisting of sulphonic acids, sulphuric acids, phosphonic acids, phosphoric acids, carboxylic acids, isocyanates, epoxides, in particular phosphoric acid, and (meth)acrylic acid;
B is a radical of the general formula (c-III):

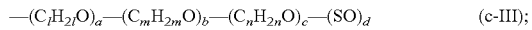

—(C$_l$H$_{2l}$O)$_a$—(C$_m$H$_{2m}$O)$_b$—(C$_n$H$_{2n}$O)$_c$—(SO)$_d$    (c-III);

where:
SO=—CH$_2$—CH(Ph)-O— where Ph=phenyl radical;
b, and c are each, independently of one another, from 0 to 100;
with the proviso that the sum a+b+c is ≥0;
d is ≥0;
l, m, and n are each, independently of one another, ≥2; and
x and y are each, independently of one another, ≥2.

Examples of amino-functional polymers are amino-functional polyamino acids such as polylysine from Aldrich Chemical Co.; amino-functional silicones which are available under the trade name Tegomer® ASi 2122 from Evonik Industries AG; polyamidoamines, which are available under the trade names Polypox®, Aradur® or "Starburst®" dendrimers from Aldrich Chemical Co.; polyallylamines and poly(N-alkyl)allylamines which are available under the trade name PAA from Nitto Boseki; polyvinylamines which available under the trade name Lupamin® from BASF AG; polyalkyleneimines, such as polyethyleneimines, which are available under the trade names Epomin® (Nippon Shokubai Co., Ltd.) and Lupasol® (BASF AG); and polypropyleneimines, which are available under the trade name Astramol® from DSM AG. Further examples of amino-functional polymers constitute the aforementioned systems by crosslinking with aminoreactive groups. This crosslinking reaction takes place, for example, via polyfunctional isocyanates, carboxylic acids, (meth)acrylates, and epoxides. Further examples are poly(meth)acrylate polymers which contain dimethylaminopropyl(meth)acrylamide (Evonik Industries AG) or dimethylaminoethyl (meth)acrylate (Evonik Industries AG) as monomers. The skilled worker is aware that other amino-functional polymers are also possible.

In a particularly preferred embodiment of the present invention the polyester group is obtained by a ring-opening polymerization with a starter molecule such as T-CH$_2$—OH or T-COOH and one or more lactones, such as β-propiolactone, β-butyrolactone, γ-butyrolactone, 3,6-dimethyl-1,4-dioxane-2,5-dione, δ-valerolactone, γ-valerolactone, ε-caprolactone, γ-caprolactone, 4-methylcaprolactone, 2-methylcaprolactone, 5-hydroxydodecanolactone, 12-hydroxydodecanolactone, 12-hydroxy-9-octadecenoic acid lactone, 12-hydroxyoctadecanoic acid lactone.

Suitable polyester-polyamines can also be obtained, by ring-opening polymerization with an amino-functional polymer, preferably polyalkyleneimines, such as polyethyleneimines, as a starter molecule and one or more lactones, such as β-propiolactone, β-butyrolactone, γ-butyrolactone, 3,6-dimethyl-1,4-dioxane-2,5-dione, δ-valerolactone, γ-valerolactone, ε-caprolactone, γ-caprolactone, 4-methylcaprolactone, 2-methylcaprolactone, 5-hydroxydodecanolactone, 12-hydroxydodecanolactone, 12-hydroxy-9-octadecenoic acid lactone, 12-hydroxyoctadecanoic acid lactone. Most preferred is a reaction product of polyethylenimine and ε-caprolactone.

Suitable polyester-polyamines are disclosed in EP 1685895 B1 which is hereby incorporated by reference in its entirety.

The structure of the fragments of the dispersants, such as e.g. the oxyalkylene moieties or the siloxane moieties, can be distributed randomly or statistically, or composed of blocks with any desired number of blocks and with any desired sequence; they can also have an alternating structure, or else form a gradient along the chain; in particular, they can also constitute any of the mixed forms in which groups of different distributions can optionally follow one another. The nature of specific embodiments can result in restrictions to the distributions. In all regions unaffected by the restriction there is no change to the distribution.

It is preferred that the dispersing agents of the inventive flame retardant compositions make up to 10 wt. %, preferably from 0.5% to 10%, by weight, more preferably 1 wt. % to 5 wt. %, even more preferably 1.5 wt. % to 5 wt. %, yet more preferably 2 wt. % to 5 wt. %, particularly preferably 2 wt. % to 4 wt. % based on the mass of the flame retardant composition.

The flame retardant composition of an embodiment preferably comprises, more preferably consists of
i. 55% to 92% by weight of the at least one phosphonate oligomer or polymer;
ii. 8% to 45% by weight of nanoparticles;
based on the flame retardant composition, summing up to 100%.

The flame retardant composition of an embodiment preferably comprises, more preferably consists of
i. 55% to 90% by weight of the at least one phosphonate oligomer or polymer;
ii. 8% to 40% by weight of nanoparticles;
iii. up to 10%, preferably from 2% to 5% by weight of the at least one dispersing agent;
based on the flame retardant composition, summing up to 100%.

The flame retardant compositions described herein are preferably used as masterbatches. These masterbatches are preferably used in the production of blends by mixing the masterbatches into a second polymer.

The blends described herein preferably comprise a "second polymer" selected from benzoxazine polymers, polyacrylates, polyacrylonitriles, polystyrenes, polyamides, preferred polyamides are PA 6, PA 11, PA 6.6 or PA 4.6, polyesters, preferred polyesters are polyethylene terephthalate (PET), polybutylene terephthalate (PBT), unsaturated polyester resins (UPS), or poly(trimethylene terephthalate), polycarbonate (PC), polyurethanes, polyureas, polyepoxies, polyimides, polyarylate, polyarylene ether, polyethylene, polyethylene oxide, polyphenylene sulfide, polypropylene, polypropylene oxide, polyphenylene oxide (PPO), polyvinyl ester, polyvinyl chloride, bismaleimide polymer, polyanhydride, polyacrylonitrile butadiene styrenes (ABS), ABS/PCs, cellulose polymer, or combinations thereof together with the inventive flame retardant composition. Preferably the second polymer is selected from polyesters, polycarbonate, polyurethanes and polyepoxies, more preferably from polyesters, in particularly the second polymer is a polyethylene terephthalate (PET), which is different from the dispersing agent.

Preferably the inventive blends contain the phosphonate polymers or copolyphosphonates at a concentration of 0.5 wt. % to 30 wt. %, 1 wt. % to 20 wt. %, 2 wt. % to 10 wt. % based on the mass of the blend.

Preferably the inventive blends contain the nanoparticles at concentrations of 0.1 wt. % to 25 wt. %, 0.5 wt. % to 15 wt. %, 1 wt. % to 10 wt. % based on the mass of the blend.

The additional polymer preferably is blended with the composition containing nanoparticles using any mixing, blending, or compounding method known in the art, preferably melt mixing.

In further preferred embodiments, blends described herein preferably comprise one or more additional components. More preferably these components are selected from fillers, fibers, surfactants, organic binders, polymeric binders, crosslinking agents, coupling agents, aramid fibres, lubricants, mould release agents such as pentaerythritol tetrastearate, nucleating agents, anti-static agents such as conductive blacks, carbon fibers, and organic antistatic agents such as polyalkylene ethers, alkylsulfonates, catalysts, colorants, inks, dyes, antioxidants, stabilizers, impact agents, other flame retardants, and any combinations thereof. The fillers are different from the at least one phosphonate oligomer or polymer (i), the nanoparticles (ii), and the at least one dispersing agent (iii). In particular, fillers based on nanoparticles are not comprised in the additional components. In such embodiments, the one or more additional components make up from 0.001 wt. % to 30 wt. %, 0.05 wt. % to 25 wt. %, 0.5 wt. % to 20 wt. %, 1.0 wt. % to 15 wt. %, or 1.5 wt. % to 10 wt. % based on the total blend composition.

Preferably the blends described herein contain water in an amount from 100 ppm by weight (wppm) up to 1 wt. % of the blend, more preferably of 500 wppm up to 0.5 wt. %, still more preferably from 0.1 wt. % to 0.2 wt. %. The water content will be determined by any method of the art, preferably by drying and weighing of a sample, more preferably by the use of a moisture analyzer HB43-S (Mettler Toledo).

The blend described herein preferably comprises
 i. the flame retardant composition described herein; and
 ii. a second polymer;
wherein the amount of the flame retardant composition is adjusted that the blend contents of 1 to 2% by weight of phosphorous based on the whole blend weight.

The use of nanoparticles with or without a dispersing agent advantageously reduces the amount of phosphonate oligomer or polymer and/or copolyphosphonates in any blend. The comparison is done with a blend comprising or not comprising the nanoparticles with or without a dispersing agent where all other components of the blend are identical in their relative amounts. The criterion of quality is the UL 94 V class, the after flame time and the speck formations defined in the examples. That means the UL 94 V class must be identical or better, if the class is identical a reduction in the number of specks is preferable. The specks are further defined in the examples described herein.

Preferably the use of nanoparticles with or without a dispersing agent reduces the amount of phosphonate oligomers or polymers of copolyphosphonates in a degree of at least 10 wt. %, more preferably 15 wt. %, 20 wt. %, 25 wt. % particularly preferably of 30 wt. % based on the mass of the blend, compared with the identical blend without nanoparticles and optionally dispersing agent, where all other components of the blend are identical in their relative amounts.

The use of nanoparticles with or without a dispersing agent advantageously induce no turbidity to the blends compared with blends which are in all other components identical as already defined above. Transparency is a measure of optical transmission of paper, foils/films and print inks. It will be measured with a SP60 of company X-rite according to the respective manual.

Preferably the dispersing agent will lower the melt flow index (MFI) of the flame retardant composition compared to the same composition without the dispersing agent. More preferably the MFI will be lowered in an amount of 10 to 50%, where the MFI is at least 0.1. Preferably the MFI will be measured according DIN EN ISO 1133.

In some embodiments, the blends described herein consist of a reinforcement material selected from glass, carbon, silicon carbide, organic fibers, and the like and combinations thereof to produce composites having an advantageous combination of fire resistance and dimensional stability while maintaining high heat distortion temperature (HDT) near that of the unmodified engineering polymer.

The blends described above including any of the components identified can be prepared by conventional means. Preferably, the respective constituents are mixed in a known manner and subjected to melt compounding and/or melt extrusion at temperatures such as 160° C. to 400° C. in customary aggregates such as internal kneaders, extruders, or twin-screw apparatuses. Mixing the individual constituents can be affected either successively or simultaneously and at about room temperature (about 20° C.) or at higher temperature. For example, in some embodiments, the components of the compositions described herein can be introduced into the polycarbonate by compounding. In other embodiments, the individual constituents can be introduced separately in different stages of the preparation process into the polymeric and/or oligomeric components. The form of addition of the compounds according to the invention is not limited. For example, the engineering plastics and/or additional components or additives can be added as solids such as a powder, as concentrate in a polycarbonate powder solution. In industrial embodiments, a side extruder may be operated with a throughput of, for example, 200-1000 kg of the polymer composition per hour.

The blends described herein are used to produce articles. The articles of the invention can be coatings or adhesives, or they can be used to fabricate articles, such as free-standing films, prepregs, fibers, foams, molded articles and fiber reinforced composites. In the case of fiber-reinforced composites, the reinforcement may be in the form of continuous, woven, or chopped fibers including, but not limited to, glass, carbon, silicon carbide, and organic fibers or combinations thereof. These articles may be well suited for a variety of applications as support parts, electrical components, electrical connectors, electrical housings, electrical covers, electrical insulators, printed wiring laminated boards, housings, covers, brackets, support structures, enclosures and subcomponents and components in consumer products that must meet UL94 classification or other standardized fire resistance standards. In some embodiments, the polymer compositions can be used in closed-mold applications or open-mold applications in the production of cured polymers that can be used in marine applications, chemical anchoring, roofing, construction, relining, pipes, tanks, flooring, windmill blades, decorative laminates (kitchen interiors), aviation and rail applications (window frames, luggage racks/storage areas, interior wall cladding panels, folding tables), and the like. Such articles of manufacture include objects or structural parts obtained by curing the polymer compositions described above. These objects and structural parts have excellent mechanical properties and excellent flame retardancy.

The polymer compositions described herein are generally self-extinguishing, i.e., they stop burning when removed from a flame and any drops produced by melting in a flame stop burning and are almost instantly extinguished and do not readily propagate fire to any surrounding materials. Moreover, these polymer compositions do not evolve noticeable smoke when a flame is applied.

EXAMPLES

Although the present invention has been described in considerable detail with reference to certain preferred embodiments thereof, other versions are possible. Therefore, the spirit and scope of the appended claims should not be limited to the description and the preferred versions contained within this specification. Various aspects of the present invention will be illustrated with reference to the following non-limiting examples. The following examples are for illustrative purposes only and are not to be construed as limiting the invention in any manner.

Materials and Methods

To determine the fire resistance of plastic preparations, each of the 5 test pieces used had a thickness of 3 mm and 0.75 mm and were produced by injection moulding. The determination of the fire class was performed according to UL 94 V (Underwriter Laboratories) (V-0, V-1, V-2, ncl) as defined above.

Nanoparticles used are Nanofil® 15 (montmorillonite, d001 2.8 nm, trademark of Südchemie, Germany), Actilox® 200 SM (boehmite, D10 200 nm, D50 350 nm, D90 600 nm, trademark of Nabaltec AG, Germany), Arginotec NX (Illite, D50 150 nm, D95 1,000 nm, B+M Nottenkaemper), and Nabalox® (trademark of Nabaltec AG, Germany).

Dispersing agents used are TEGOMER® P121 (polyacrylate), TEGOMER® DA626 (polyester polyamine), TEGOMER® 6440P (polyester modified polysiloxane), TEGOPREN® 6877 (polyether modified polysiloxane) and TEGOPREN® 5885 (polyether modified polysiloxane) (all TEGO* are trademarks of Evonik, Germany). The numbers are further on used as abbreviations in brackets.

Flame retardant compound were Nofia® CO6000 and HM1100 (trademark of FRX Polymers, United States)

The water content of the blends was determined with Moisture Analyzer HB43-S (Mettler-Toledo) using a 17.5 g sample (weight out with 3 digits) at a temperature of 200° C. Mass constancy for 1 minute was the measurement-finishing criterion.

Example 1: Production of Masterbatches of Different Nanoparticles with and without Additional Additives The flame retardant Nofia HM1100 was dried before compounding for 6 hours at 80° C. in a double desiccant tower dryer (Piovan DP 604, Fa. Piovan). The residual moisture was below 0.02 wt. %.

With a compounding extruder 27 mm (twin-screw extruder from Leistritz, 40L/D) masterbatches were prepared at 300 rpm at 210-220° C. with 10 kg/h as listed in Table 1 Nofia HM 1100 was fed in the main feeder whereas the dry or pre dried nanoparticles were fed in extrusion block zone 4.

TABLE 1

Masterbatches with different fillers with and without dispersing agents (flame retardant compositions); meltflow index (MFI)

| | HM1100 [wt. %] | Nanoparticles [wt. %] | Dispersing Agent [wt. %] | MFI; 1.2 kg/ 210° C. |
|---|---|---|---|---|
| MB1 | 90 | 10 (Nanofil 15) | — | 24.8 |
| MB2 | 90 | 10 (Actilox 200SM) | — | 13.2 |
| MB3 | 90 | 10 (Arginotex NX) | — | 17.9 |
| MB4 | 80 | 20 (Nanofil 15) | — | 16.8 |
| MB5 | 80 | 20 (Actilox 200SM) | — | 30.1 |
| MB6 | 80 | 20 (Arginotex NX) | — | 18.7 |
| MB7 | 78 | 20 (Nanofil 15) | 2 (P 121) | 2.6 |
| MB8 | 78 | 20 (Nanofil 15) | 2 (6877) | 72.0 |
| MB9 | 78 | 20 (Nanofil 15) | 2 (6440P) | 40.1 |
| MB10 | 78 | 20 (Nanofil 15) | 2 (5885) | 107.5 |
| MB11 | 78 | 20 (Actilox 200SM) | 2 (P 121) | 25.1 |
| MB12 | 78 | 20 (Actilox 200SM) | 2 (6877) | 25.9 |
| MB13 | 78 | 20 (Actilox 200SM) | 2 (6440P) | 28.4 |
| MB14 | 78 | 20 (Actilox 200SM) | 2 (5885) | 22.0 |
| MB15 | 78 | 20 (Arginotex NX) | 2 (P 121) | 35.4 |
| MB16 | 78 | 20 (Arginotex NX) | 2 (6877) | 39.3 |
| MB17 | 78 | 20 (Arginotex NX) | 2 (6440P) | 26.3 |
| MB18 | 78 | 20 (Arginotex NX) | 2 (5885) | 27.1 |
| MB19 | 60 | 40 (Nanofil 15) | — | 7.5 |
| MB20 | 60 | 40 (Actilox 200SM) | — | 5.2 |
| MB21 | 60 | 40 (Arginotex NX) | — | Non producible |
| MB22 | 56 | 40 (Nanofil 15) | 4 (P 121) | <0.5 |
| MB23 | 56 | 40 (Nanofil 15) | 4 (6877) | 36.8 |
| MB24 | 56 | 40 (Nanofil 15) | 4 (6440P) | 14.2 |
| MB25 | 56 | 40 (Nanofil 15) | 4 (5885) | 60.3 |
| MB26 | 56 | 40 (Actilox 200SM) | 4 (P 121) | 15.3 |
| MB27 | 56 | 40 (Actilox 200SM) | 4 (6877) | 17.6 |
| MB28 | 56 | 40 (Actilox 200SM) | 4 (6440P) | 13.8 |
| MB29 | 56 | 40 (Actilox 200SM) | 4 (5885) | 17.1 |
| MB30 | 56 | 40 (Arginotex NX) | 4 (P 121) | 20.1 |
| MB31 | 56 | 40 (Arginotex NX) | 4 (6877) | 22.4 |
| MB32 | 56 | 40 (Arginotex NX) | 4 (6440P) | 19.8 |
| MB33 | 56 | 40 (Arginotex NX) | 4 (5885) | 21.4 |
| MB34 | 58 | 40 (Nanofil 15) | 2 (5885) | 50.2 |
| MB35 | 58 | 40 (Actilox 200SM) | 2 (5885) | 13.9 |
| MB36 | 58 | 40 (Arginotex NX) | 2 (5885) | 15.6 |

Dispersing agent use allows processability by dropping of amperage and no significant built up of pressure is detectable. Furthermore, dispersing agents allow significant improvement of dispersibility of nanoparticles and the processability can be improved to relative high MFI values which goes parallel with high throughput during extrusion of the Nofia HM1100 nanoparticle masterbatches. However, special dispersing agents can also be used to obtain low MFI values of such masterbatches, which allows for moulding applications of FR compounds to have a low pronounced dripping behavior.

Example #2: Production of Compounds Based on PET Resin

PET (Lighter C 93, Equipolymers) was dried before compounding for 6 hours at 80° C. in a double desiccant tower dryer (Piovan DP 604, Fa. Piovan). The residual moisture was below 0.1 wt. %.

With a compounding extruder 27 mm (twin-screw extruder from Leistritz) flame resistance (FR) compounds were prepared at 300 rpm at 265°-275° C. by blending PET resin with masterbatches (see table 1) to achieve invention related FR compounds or blending PET resin with HM 1100 without nanoparticles to achieve comparable not invention related data.

Both components had been fed together in the main feeder zone.

Final compositions were prepared as indicated in table 2.

Given values in column PET, Nofia HM1100 and MB are parts by weight. These values add to 100 respectively. The final concentrations are calculated in wt. %

PET was mixed with Nofia HM1100 to a final concentrations of 8 wt. % (FR. 1), 9 wt. % (FR. 2), 10 wt. % (FR. 3), and 12 wt. % (FR. 4) in an extruder, as indicated in TABLE 2 to create non invention related data. Specimens are molded with a thickness of 3 mm and 0.75 mm and tested according the UL94 protocol.

For some trials not only resin and Nofia HM1100 nanoparticle masterbatches were mixed but additional non-modified Nofia HM1100 was blended as third component during extrusion to receive other ratios of Nofia HM1100 and nanoparticles in an efficient way (FR 11-FR 25)

TABLE 2

Final compositions of FR compounds based on PET (blends; FR1 to FR4 are comparative) for thin layer application which are used to mold 0.75 mm thick specimen for UL 94 testing.

| sample | PET | HM1100 | MB | HM1100 [wt %] | Nanoparticles [wt %] | Dispersing Agent [wt %,] |
|---|---|---|---|---|---|---|
| FR1 | 92 | 8 | — | 8 | 0 | 0 |
| FR2 | 91 | 9 | — | 9 | 0 | 0 |
| FR3 | 90 | 10 | — | 10 | 0 | 0 |
| FR4 | 88 | 12 | — | 12 | 0 | 0 |
| FR5 | 90 | — | 10 (MB1) | 9 | 1 | 0 |
| FR6 | 90 | — | 10 (MB2) | 9 | 1 | 0 |
| FR7 | 90 | — | 10 (MB3) | 9 | 1 | 0 |
| FR8 | 90 | — | 10 (MB4) | 8 | 2 | 0 |
| FR9 | 90 | — | 10 (MB5) | 8 | 2 | 0 |
| FR10 | 90 | — | 10 (MB6) | 8 | 2 | 0 |
| FR11 | 89 | 1 | 10 (MB4) | 9 | 2 | 0 |
| FR12 | 89 | 1 | 10 (MB5) | 9 | 2 | 0 |
| FR13 | 89 | 1 | 10 (MB6) | 9 | 2 | 0 |
| FR14 | 89 | 1 | 10 (MB7) | 8..8 | 2.0 | 0.2 |
| FR15 | 89 | 1 | 10 (MB8) | 8.8 | 2.0 | 0.2 |
| FR16 | 89 | 1 | 10 (MB9) | 8.8 | 2.0 | 0.2 |
| FR17 | 89 | 1 | 10 (MB10) | 8.8 | 2.0 | 0.2 |
| FR18 | 89 | 1 | 10 (MB11) | 8.8 | 2.0 | 0.2 |
| FR19 | 89 | 1 | 10 (MB12) | 8.8 | 2.0 | 0.2 |
| FR20 | 89 | 1 | 10 (MB13) | 8.8 | 2.0 | 0.2 |
| FR21 | 89 | 1 | 10 (MB14) | 8.8 | 2.0 | 0.2 |
| FR22 | 89 | 1 | 10 (MB15) | 8.8 | 2.0 | 0.2 |
| FR23 | 89 | 1 | 10 (MB16) | 8.8 | 2.0 | 0.2 |
| FR24 | 89 | 1 | 10 (MB17) | 8.8 | 2.0 | 0.2 |
| FR25 | 89 | 1 | 10 (MB18) | 8.8 | 2.0 | 0.2 |
| FR 26 | 90 | — | 10 (MB 24) | 5.6 | 4 | 0.4 |
| FR 27 | 86.7 | — | 13.3 (MB 24) | 7.5 | 5.3 | 0.5 |
| FR 28 | 85 | — | 15 (MB 24) | 8.4 | 6.0 | 0.6 |
| FR 29 | 83.4 | — | 16.6 (MB 24) | 9.3 | 6.6 | 0.7 |
| FR 30 | 90 | — | 10 (MB 19) | 6.0 | 4.0 | 0 |
| FR 31 | 90 | — | 15 (MB 19) | 9.0 | 6.0 | 0 |
| FR 32 | 90 | — | 10 (MB 20) | 6.0 | 4.0 | 0 |
| FR 33 | 90 | — | 15 (MB 20) | 9.0 | 6.0 | 0 |
| FR 34 | 85 | — | 15 (MB 22) | 8.4 | 6.0 | 0.6 |
| FR 35 | 85 | — | 15 (MB 23) | 8.4 | 6.0 | 0.6 |
| FR 36 | 85 | — | 15 (MB 25) | 8.4 | 6.0 | 0.6 |
| FR 37 | 86.7 | — | 13.3 (MB 22) | 7.5 | 5.3 | 0.5 |
| FR 38 | 86.7 | — | 13.3 (MB 23) | 7.5 | 5.3 | 0.5 |
| FR 60 | 86.7 | — | 13.3 (MB 25) | 7.5 | 5.3 | 0.5 |
| FR 39 | 86.7 | — | 13.3 (MB 26) | 7.5 | 5.3 | 0.5 |
| FR 40 | 85 | — | 15.0 (MB 26) | 8.4 | 6.0 | 0.6 |
| FR 41 | 86.7 | — | 13.3 (MB 27) | 7.5 | 5.3 | 0.5 |
| FR 42 | 85 | — | 15.0 (MB 27) | 8.4 | 6.0 | 0.6 |
| FR 43 | 86.7 | — | 13.3 (MB 30) | 7.5 | 5.3 | 0.5 |
| FR 44 | 85 | — | 15.0 (MB 30) | 8.4 | 6.0 | 0.6 |

TABLE 2-continued

Final compositions of FR compounds based on PET (blends; FR1 to FR4 are comparative) for thin layer application which are used to mold 0.75 mm thick specimen for UL 94 testing.

| sample | PET | HM1100 | MB | HM1100 [wt %] | Nanoparticles [wt %] | Dispersing Agent [wt %,] |
|---|---|---|---|---|---|---|
| FR 45 | 86.7 | | 13.3 (MB 31) | 7.5 | 5.3 | 0.5 |
| FR 46 | 85 | | 15.0 (MB 31) | 8.4 | 6.0 | 0.6 |
| FR 47 | 86.7 | | 13.3 (MB 34) | 7.7 | 5.3 | 0.3 |
| FR 48 | 85 | | 15.0 (MB 34) | 8.7 | 6.0 | 0.3 |
| FR 49 | 83.4 | | 16.6 (MB 34) | 9.6 | 6.6 | 0.4 |
| FR 50 | 86.7 | | 13.3 (MB 35) | 7.7 | 5.3 | 0.3 |
| FR 51 | 85 | | 15.0 (MB 35) | 8.7 | 6.0 | 0.3 |
| FR 52 | 83.4 | | 16.6 (MB 35) | 9.6 | 6.6 | 0.4 |
| FR 53 | 86.7 | | 13.3 (MB 36) | 7.7 | 5.3 | 0.3 |
| FR 54 | 85 | | 15.0 (MB 36) | 8.7 | 6.0 | 0.3 |
| FR 55 | 83.4 | | 16.6 (MB 36) | 9.6 | 6.6 | 0.4 |
| FR 56 | 88.5 | | 11.5 (MB 7) | 9.0 | 2.3 | 0.2 |
| FR 57 | 88.5 | | 11.5 (MB 8) | 9.0 | 2.3 | 0.2 |
| FR 58 | 88.5 | | 11.5 (MB 9) | 9.0 | 2.3 | 0.2 |
| FR 59 | 88.5 | | 11.5 (MB 10) | 9.0 | 2.3 | 0.2 |

Dispersing Agent wt. % are sometimes very small and values in the table above are considered as rounded values.

Machine parameters: 10 kg/h for all samples

Specks are counted on the area of the molded specimen with 0.75 mm thickness.

The higher the number of specks the poorer the dispersibility. The use of dispersing agents leads to good flame resistance and low speck formation. Judgment is based on the following system in table 3:

Class 1: 0-4 specks
Class 2: 5-10 specks
Class 3: 10-15 specks
Class 4: more than 15 specks

TABLE 3

Results flame retardant properties of the compositions of table 2: UL 94 classification V-0, V-1 and V-2 and spec classification (FR1 to FR4 are comparative)

| Sample | UL94 Specimen 0.75 mm [V-0, V-1, V-2, ncl] | Speck Classification [Class 1-4] |
|---|---|---|
| FR1 | V-2 | |
| FR2 | V-2 | |
| FR3 | V-2 | |
| FR4 | V-0 | |
| FR5 | V-0 | 3 |
| FR6 | V-0 | 3 |
| FR7 | V-0 | 3 |
| FR8 | V-2 | 4 |
| FR9 | V-2 | 4 |
| FR10 | V-2 | 4 |
| FR11 | V-0 | 4 |
| FR12 | V-0 | 4 |
| FR13 | V-0 | 4 |
| FR14 | V-0 | 1 |
| FR15 | V-0 | 1 |
| FR16 | V-0 | 1 |
| FR17 | V-0 | 1 |
| FR18 | V-0 | 1 |
| FR19 | V-0 | 1 |
| FR20 | V-0 | 1 |
| FR21 | V-0 | 1 |
| FR22 | V-0 | 1 |
| FR23 | V-0 | 1 |
| FR24 | V-0 | 1 |
| FR25 | V-0 | 1 |
| FR 26 | V-2 | 2 |
| FR 27 | V-0 | 2 |
| FR 28 | V-0 | 2 |
| FR 29 | V-0 | 2 |
| FR 30 | ncl | 4 |
| FR 31 | V-0 | 3 |
| FR 32 | ncl | 4 |
| FR 33 | V-0 | 3 |
| FR 34 | V-0 | 1 |
| FR 35 | V-0 | 1 |
| FR 36 | V-0 | 2 |
| FR 37 | V-0 | 1 |
| FR 38 | V-0 | 2 |
| FR 60 | V-0 | 1 |
| FR 39 | V-0 | 1 |
| FR 40 | V-0 | 2 |
| FR 41 | V-0 | 1 |
| FR 42 | V-0 | 2 |
| FR 43 | V-0 | 2 |
| FR 44 | V-0 | 1 |
| FR 45 | V-0 | 1 |
| FR 46 | V-0 | 2 |
| FR 47 | V-0 | 2 |
| FR 48 | V-0 | 2 |
| FR 49 | V-0 | 2 |
| FR 50 | V-0 | 1 |
| FR 51 | V-0 | 1 |
| FR 52 | V-0 | 1 |
| FR 53 | V-0 | 2 |
| FR 54 | V-0 | 2 |
| FR 55 | V-0 | 2 |
| FR 56 | V-0 | 2 |
| FR 57 | V-0 | 2 |
| FR 58 | V-0 | 2 |
| FR 59 | V-0 | 2 |

Example #3: Production of Compounds Based on Polycarbonate (PC) Resin

PC (Lexan 101R) was obtained from SABIC). Joncryl 4300 was obtained from BASF.

A 27 millimeter twin screw extruder (TSE) was used to compound a variety of polycarbonate blends. The temperature for the extruder started at 200° C. at the feeding block, and the subsequent zones were set at a reverse temperature profile from 235° C. to 225° C. The compounding was conducted at 20 lbs/hour with a screw speed of 100 rpm. All ingredients were used after being dried overnight in a desiccant dryer with −40° C. dewpoint and mixed before putting into the feed hopper.

The data in Table 4 show that when adding 20 wt % of Nofia HM1100, only a V2/0.8 mm can be obtained. However, when adding the MB13 to a similar concentration of Nofia HM1100 but with additional nanoparticles and dispersing agent, the flame retardancy is improved to a V0/0.8 mm. Furthermore, optical measurements done on compression molded plaques of 0.4 mm show that the optical transmission (% T, measured with a BYK Gardner Haze-Gard Plus according ASTM D1003) of the blend with the nanoparticles is still maintained at 80%.

TABLE 4

Results flame retardant properties of PC blends

| Sample | Comparative Example 1 | Example 1 |
|---|---|---|
| Lexan 101R [wt %] | 79 | 74 |
| Nofia HM1100 [wt %] | 20 | — |
| MB13 [wt %] | — | 25 |
| Joncryl 4300 [wt %] | 1 | 1 |
| UL94 (0.8 mm) | V2 | V0 |
| t-max [s] | 7 | 4 |
| t1 + t2 [s] | 23 | 15 |
| Total drips | 16 | 0 |
| Flaming drips | 16 | 0 |
| % T (0.4 mm) | 89 | 80 |

Example #4: Production of Compounds Based on PBT Resin

PBT (Ultradur 4520) was obtained from BASF). Glass fibers (GF, HP3730) were obtained from PPG. Irganox B900 and 1010 were obtained from BASF. Melamine Cyanurate (MC25) was obtained from BASF. Teflon® PTFE 6C—Polytetrafluoroethylene (PTFE) was obtained from DuPont A 27 millimeter twin screw extruder (TSE) was used to compound a variety of PBT blends. The temperature for the extruder started at 200° C. at the feeding block, and the subsequent zones were set at a temperature profile from 230° C. to 255° C. The compounding was conducted at 20 lbs/hour with a screw speed of 100 rpm. All ingredients were used after being dried overnight in a desiccant dryer with −40° C. dewpoint and mixed before putting into the feed hopper.

The results in Table 5 show that Comparative Example 2 only obtained a V2/0.8 mm rating because of the occurrence of flaming drips. Typically, one can add Teflon to a formulation to limit the flaming drips as show in Comparative Example 3. To maintain short enough flame out times, the amount of phosphor based FR (Nofia CO6000) should be kept the same (PTFE will not reduce the flame out time).

Example 2 shows that adding a small amount of MB10 while reducing the amount of Nofia CO6000 to keep the total amount of phosphor in the blend comparable to Comparative Example 2, it is possible to obtain a rating of V0/0.8 mm even in the absence of PTFE. This is especially important for applications that cannot contain any halogens. In many electronic applications, halogen free flame retardant formulations are required and no or only a limited amount of chlorine or bromine containing flame retardants are allowed. However, in these applications, Teflon (containing the halogen fluorine) is allowed as a drip suppressant and not considered as a halogen containing flame retardant. But more and more standards and legislation come into practice that will also not allow Teflon anymore. The formulations of the present invention can be a solution to these applications.

TABLE 5

Results flame retardant properties of 25 wt % GF PBT blends (all compositions contain 0.3 wt % Irganox B900 and 0.3 wt % Irganox 1010)

| Sample | Comparative Example 2 | Comparative Example 3 | Example 2 |
|---|---|---|---|
| PBT [wt %] | 37.4 | 36.8 | 37.4 |
| Nofia CO6000 [wt %] | 25 | 25 | 20 |
| MB10 [wt %] | — | — | 5 |
| MC [wt %] | 12 | 12 | 12 |
| PTFE [wt %] | — | 0.6 | — |
| UL94 (0.8 mm) | V2 | V0 | V0 |
| t-max [s] | 2 | 4 | 5 |
| t1 + t2 [s] | 10 | 20 | 25 |
| Total drips | >6 | 0 | 0 |
| Flaming drips | 5 | 0 | 0 |

The invention claimed is:
1. A flame retardant composition, comprising:
(i) 55 to 92% by weight of at least one phosphonate oligomer or polymer, comprising units of formula (I):

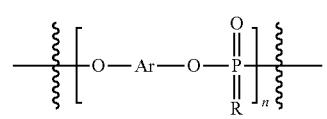

wherein:
each Ar is independently the same or different aromatic or aromatic containing group;
each R is independently the same or different group selected from $C_{1-20}$ alkyl, $C_{2-20}$ alkene, $C_{2-20}$ alkene, $C_{5-20}$ cycloalkyl, or $C_{6-20}$ aryl; and
n is from 3 to 200;
(ii) 1% to 44.5% by weight of nanoparticles based on the weight of flame retardant composition, nanoparticles have a length in at least one dimension of 1 nm to 1000 nm which are selected from the group consisting of attapulgite, bentonite, montmorillonite, boehmite, illite, hydroxyapatite, smectite, kaolinite, dickite, nitrite, sepiolite, hectorite, halloysite and talcum particles, or any combination thereof; and
(iii) 0.5% to 10% by weight of dispersing agent(s) based on the weight of the flame retardant composition.
2. The flame retardant composition according to claim 1, wherein the phosphonate oligomer or polymer contains from 2% to 18% by weight of the element phosphorous based on the weight of the phosphonate oligomer or polymer, respectively.

3. The flame retardant composition according to claim 1, wherein the phosphonate oligomer or polymer further comprises units of the formulae (II), (III), or (II) and (III)

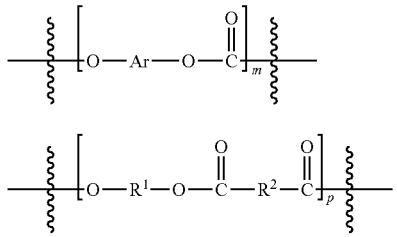

wherein
each Ar is independently the same or different aromatic or aromatic containing group;
each $R^1$ and $R^2$ is independently the same or different aliphatic or aromatic hydrocarbon selected from $C_{1-20}$ alkyl, $C_{2-20}$ alkene, $C_{2-20}$ alkyne, $C_{5-20}$ cycloalkyl, or $C_{6-20}$ aryl; and
each m and p is independently from 1 to 150.

4. The flame retardant composition according to claim 3, wherein Ar is selected from $C_{6-20}$ aryl.

5. The flame retardant composition according to claim 3, wherein, the —O—Ar—O— moiety in formula (I) and/or (II) is derived from an aromatic diol selected from the group consisting of resorcinols, hydroquinones, catechols, and bisphenols, or any combination thereof.

6. The flame retardant composition according to claim 1, wherein the nanoparticles have a length in at least one dimension of 1 nm to 100 nm.

7. The flame retardant composition according to claim 1, wherein the dispersing agent is selected from the group consisting of waxes, organic acid derivatives, and oligomeric/polymeric derivatives, or any combination thereof.

8. The flame retardant composition according to claim 1, wherein the dispersing agent is selected from the group consisting of polyether modified siloxanes, polyester modified siloxanes, polyacrylates and polyester polyamines, or any combination thereof.

9. The flame retardant composition according to claim 1, wherein at least one dispersing agent is a polyether modified siloxane of the general formula (A):

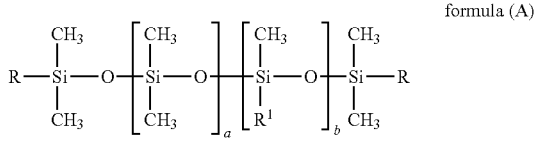 formula (A)

where
R identically or differently is $R^1$, methyl, or hydroxy,
$R^1$ identically or differently is a polyether moiety of the formula (A')

 formula (A')

where
Z is a branched or unbranched alkylene moiety having from 2 to 4 carbon atoms,
m is from 2 to 4,
n is from 1 to 3,
o is 0 or 1,
AO identically or differently is an oxyalkylene moiety comprising one or more oxyethylene, oxypropylene, and/or oxybutylene moieties,
$R^3$ identically or differently is hydrogen or an alkyl moiety having from 1 to 4 carbon atoms,
with the proviso that in $R^1$ the total number of carbon atoms and oxygen atoms is at least 70,
a is from 20 to 200,
b is from 1 to 50,
with the proviso that if none of the moieties R is $R^1$, b is at least 3.

10. The flame retardant composition according to claim 1, wherein at least one dispersing agent is a polyether modified siloxane of the general formula (B)

formula (B)

$$R^2-\underset{\underset{R^1}{|}}{\overset{\overset{R^1}{|}}{Si}}-O\left[\underset{\underset{R^2}{|}}{\overset{\overset{R^1}{|}}{Si}}-O\right]_a\left[\underset{\underset{\left[\underset{\underset{O}{|}}{\overset{\overset{R^1}{|}}{Si}}-R^2\right]_a}{|}}{\overset{\overset{R^1}{|}}{Si}}-O\right]-\underset{\underset{R^1}{|}}{\overset{\overset{R^1}{|}}{Si}}-R^2,$$

where the radicals
$R^1$ are alkyl radicals having 1 to 4 carbon atoms or aryl radicals, but at least 80% of the radicals $R^1$ are methyl radicals,
$R^2$ in the molecule are identical or different and have the following definitions:
(a)

$$-\left[CH\underset{c}{\right]}-O-\left(CH_2-CH_2-O\right)_d-H_2C-\underset{\underset{CH_3}{|}}{\overset{\overset{R^3}{|}}{CH}}-O\underset{e}{\right)}-R^4$$
$$-\left[CH\underset{c}{\right]}-O-\left(H_2C-CH_2-O\right)_d-H_2C-\underset{\underset{CH_3}{|}}{\overset{\overset{R^3}{|}}{CH}}-O\underset{e}{\right)}-R^4$$

in which
$R^3$ is a hydrogen or alkyl radical,
$R^4$ is a hydrogen, alkyl or carboxyl radical,
c is a number from 1 to 20,
d is a number from 0 to 50,
e is a number from 0 to 50, or
(b)

$-(CH_2-)_fOR^5$, in which
$R^5$ is a hydrogen, alkyl or carboxyl radical or a dimethylol propane radical containing ether groups if desired, and
f is a number from 2 to 20, or
(c)

$-(CH_2-)_g(OC_2H_4-)_h(OC_3H_6-)_i(OC_4H_8)_j$
$(OCH_2CH(C_6H_5))_kOR^6$ in which
$R^6$ is a hydrogen, alkyl or carboxyl radical,
g is a number from 2 to 6, h is a number from 0 to 20,
i is a number from 1 to 50,
j is a number from 0 to 10,
k is a number from 0 to 10, or (d) corresponds to the radical $R^1$, with the proviso that in the average molecule at least one radical $R^2$ has the definition (a), a is a number from 1 to 500, and
b is a number from 0 to 10.

11. The flame retardant composition according to claim 1, wherein at least one dispersing agent is a polyester modified siloxane of the general formula (C)

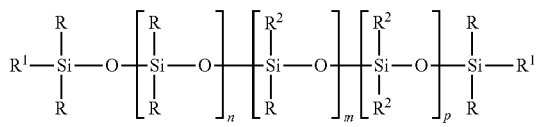

formula (C)

where

R, independently of one another, are an alkyl moiety having from 1 to 11 carbon atoms, $R^1$, independently of one another, are R or a polyester moiety, $R^2$, independently of one another, are R or a polyester moiety, n, m and p, independently of one another, are from 0 to 58, with the proviso that N=n+m+p+2 is from 15 to 75, and no $R^1$ is R when all $R^2$ are R, and at least one $R^2$ is not R when all $R^1$ are R and/or no moiety $R^1$ is R when m and p are 0, and m or p is not 0 when all moieties $R^1$ are R.

12. The flame retardant composition according to claim 1, comprising:

(i) 55% to 92% by weight of the at least one phosphonate oligomer or polymer;
(ii) 8% to 44.5% by weight of the nanoparticles; and
(iii) 0.5 to 10% by weight of the at least one dispersing agent;
based on the weight of the flame retardant composition, summing up to 100%.

13. A blend, comprising:
(i) the flame retardant composition according to claim 1; and
(ii) a second polymer.

14. The blend according to claim 13, wherein the second polymer is selected from the group consisting of benzoxazine polymer, polyacrylates, polyacrylonitriles, polystyrenes polyamides, polyesters, polycarbonate, polyurethanes, polyureas, polyepoxys, polyimides, polyarylate, polyarylene ether, polyethylene, polyethylene oxide, polyphenylene sulfide, polypropylene, polyphenylene oxide, polyvinyl ester, polyvinyl chloride, bismaleimide polymer, polyanhydride, polyacrylonitrile butadiene styrenes, and cellulose polymer, or any combination thereof.

15. The blend according to claim 13, wherein the second polymer is polycarbonate and the optical transmission of the blend is equal or larger than 80% when measured on a 0.4 mm thick specimen.

16. The blend according to claim 13, wherein the amount of flame retardant composition is adjusted that the blend contents of 1% to 2% by weight of the element phosphorous based on the whole blend weight.

17. A method for making the flame retardant composition according to claim 1, comprising:
(i) mixing a first polymer or oligomer with nanoparticles, and a dispersing agent, successively or simultaneously, wherein the first polymer or oligomer is a phosphonate polymer or oligomer, respectively,
(ii) subjecting the blend to a compounder, and
(iii) heating the blend to a temperature of about 20° C. to about 400° C.

18. An article of manufacture comprising a blend according to claim 13, wherein the article is selected from the group consisting of coatings, adhesives, fibers, free-standing films, sheets, prepregs, foams, fiber reinforced composites, and molded articles.

19. A method for making the blend according to claim 13, comprising:
(i) mixing a first polymer or oligomer with nanoparticles, and a dispersing agent, successively or simultaneously, wherein the first polymer or oligomer is a phosphonate polymer or oligomer comprising units of formula (I), respectively,
(i') blending the second polymer with the composition,
(ii) subjecting the blend to a compounder, and
(iii) heating the blend to a temperature of about 20° C. to about 400° C.

20. The flame retardant composition according to claim 5, wherein said aromatic diol is a bisphenol selected from the group consisting of bisphenol A, bisphenol F, 4,4'-biphenol, phenolphthalein or phenolphthalein derivatives, 4,4'-thiodiphenol, 4,4'-sulfonyldiphenol, and 1,1-bis-(4-hydroxyphenyl)-3,3,5-trimethylcyclohexane, or any combination thereof.

* * * * *